Oct. 9, 1928.
C. FLAGSTAD
COLLAPSIBLE CRATE
Filed Nov. 26, 1923 3 Sheets-Sheet 1
1,687,331
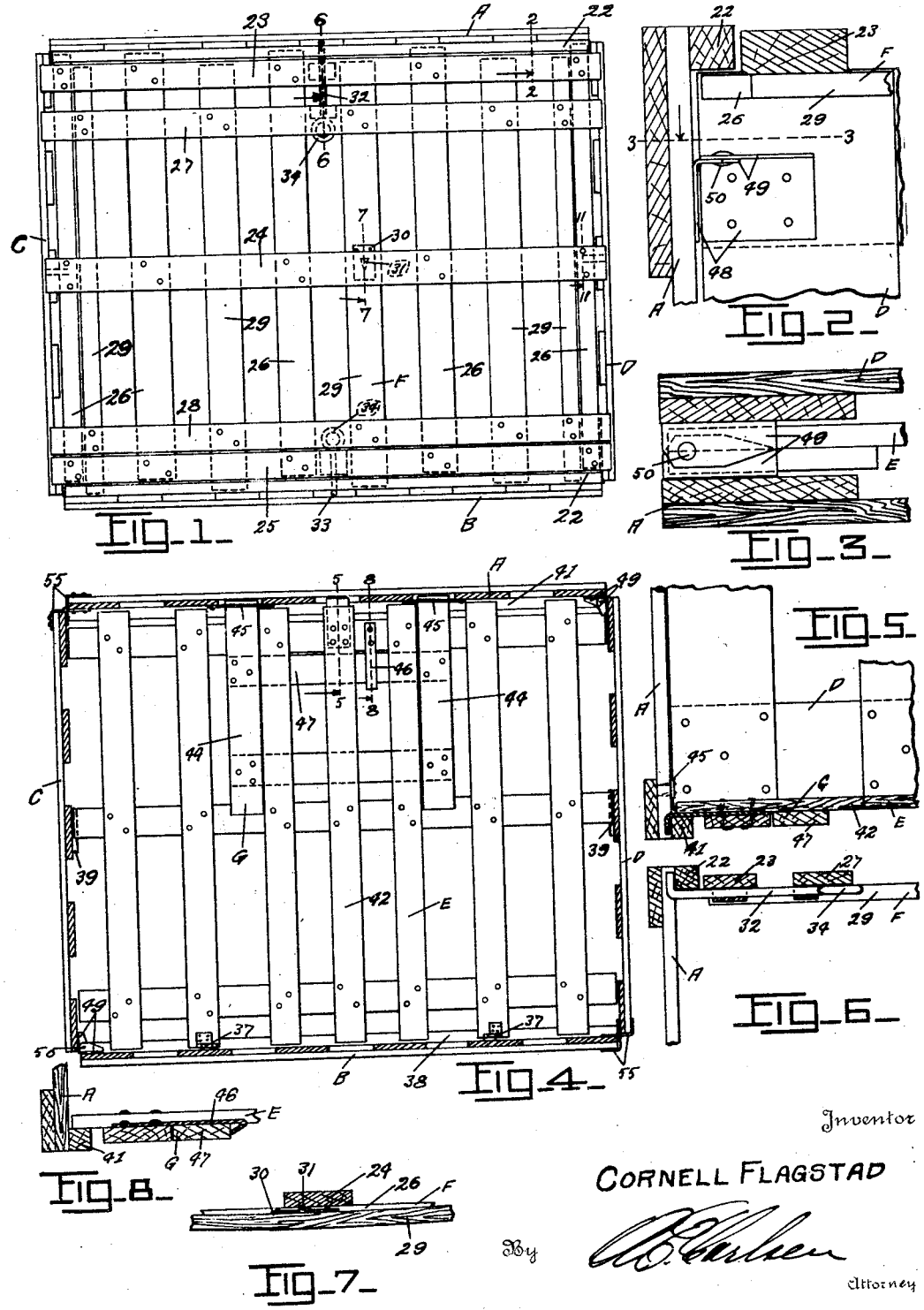
Inventor
CORNELL FLAGSTAD
By
Attorney Oct. 9, 1928.
C. FLAGSTAD
1,687,331
COLLAPSIBLE CRATE
Filed Nov. 26, 1923   3 Sheets-Sheet 2
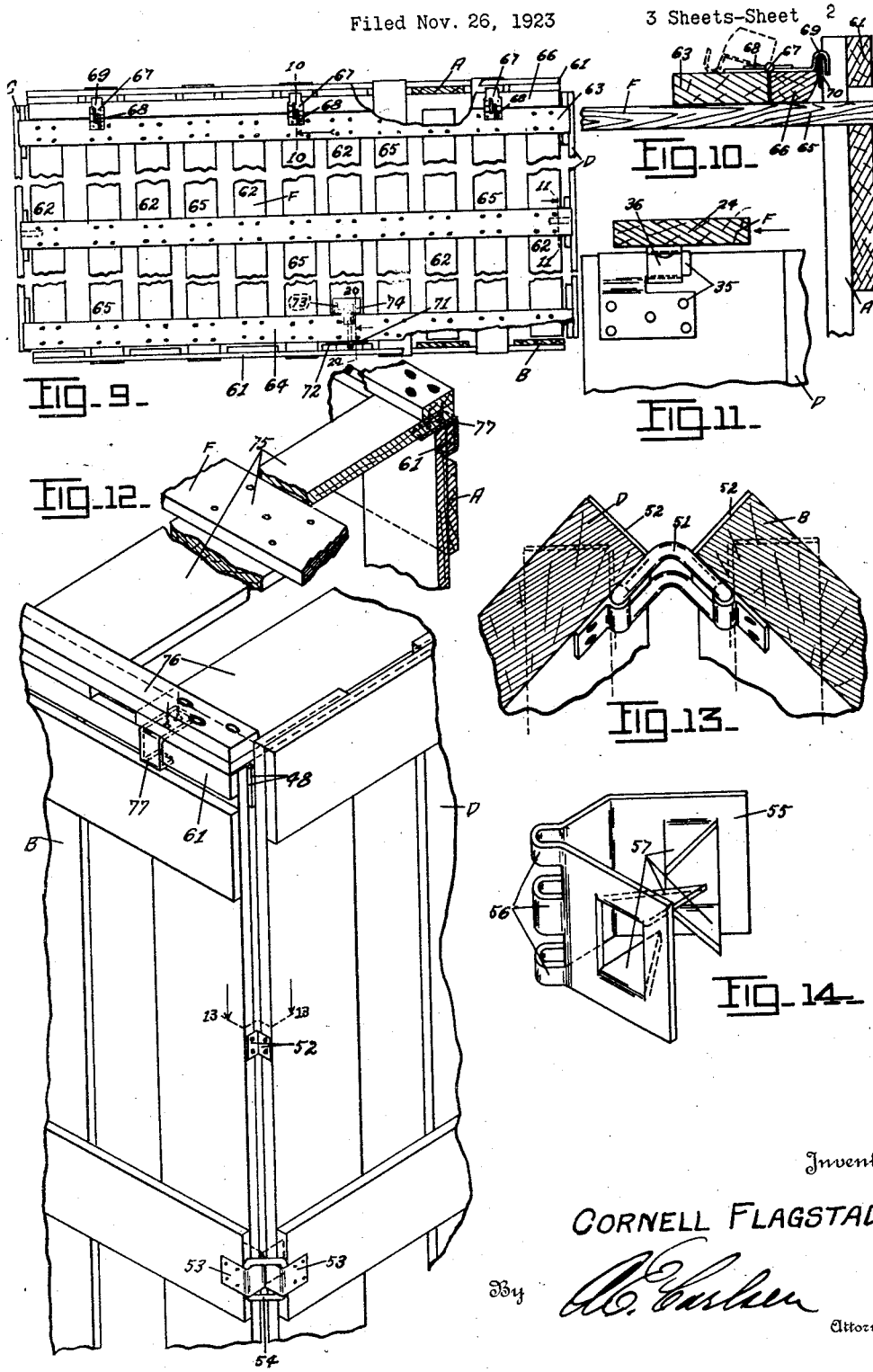
Inventor
CORNELL FLAGSTAD
By
Attorney Oct. 9, 1928.
C. FLAGSTAD
COLLAPSIBLE CRATE
Filed Nov. 26, 1923     3 Sheets-Sheet 3
1,687,331
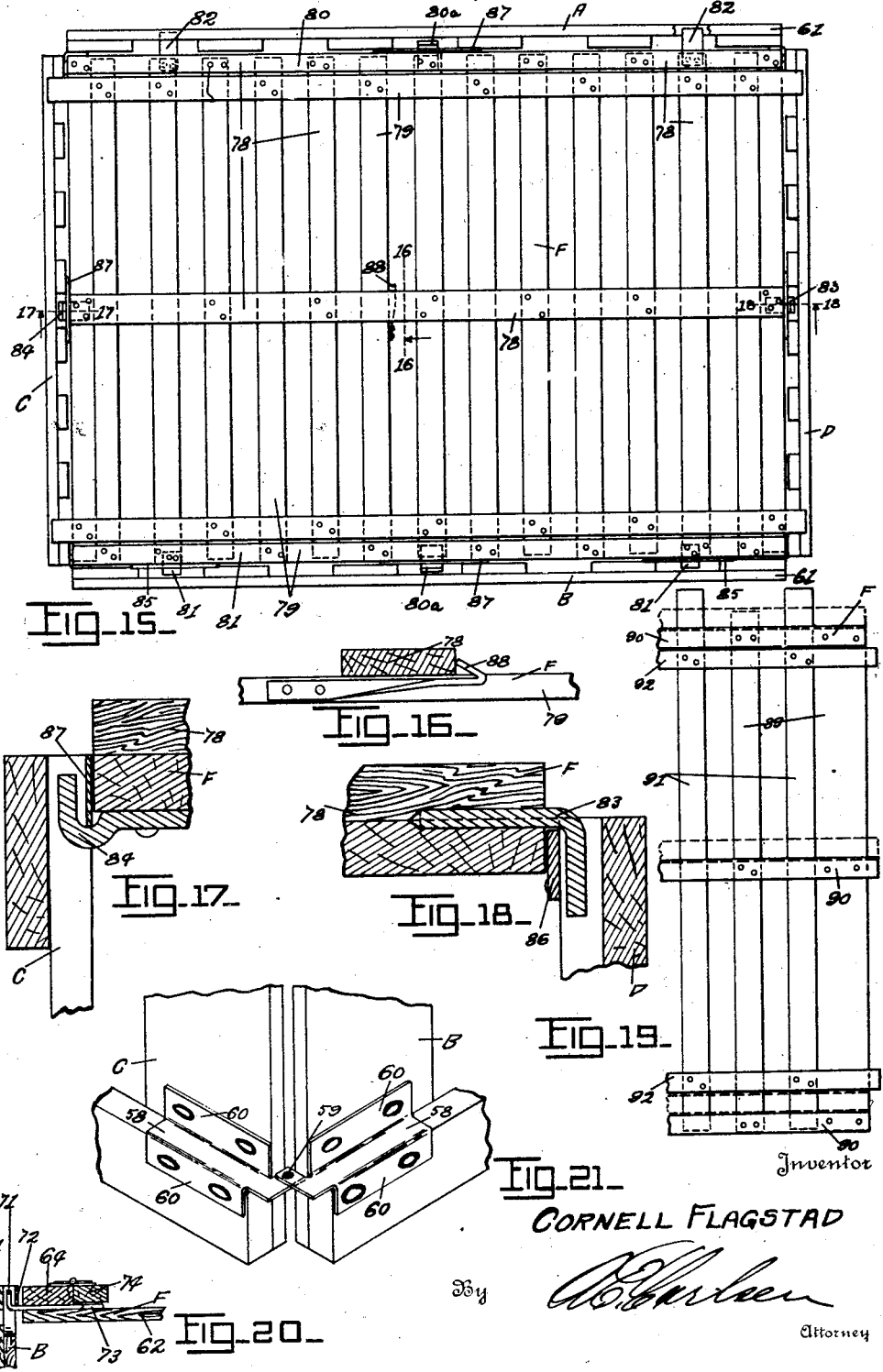
CORNELL FLAGSTAD Patented Oct. 9, 1928.

1,687,331

UNITED STATES PATENT OFFICE.

CORNELL FLAGSTAD, OF MINNEAPOLIS, MINNESOTA, ASSIGNOR OF NINETY-FIVE PER CENT TO THE FOLDING CRATE AND BOX CO., A CORPORATION OF MINNESOTA, AND TWO AND ONE-HALF PER CENT TO OSCAR A. FLAGSTAD, OF MINNEAPOLIS, MINNESOTA.

COLLAPSIBLE CRATE.

Application filed November 26, 1923. Serial No. 677,175.

This invention relates to collapsible carriers and the main object is to provide a highly novel, efficient and practical construction of folding crate or box, in which the side and end sections are permanently hinged together, and in which the top and bottom sections are secured in such a manner that they may be readily released when the container is to be "knocked down" or folded together, as when the crate is to be returned empty to the original shipper. Further and more specific objects will be disclosed in the course of the following specification and are clearly illustrated by the structures shown in the accompanying drawings, wherein:

Fig. 1 is a top or plan elevation of a preferred construction of the crate.

Fig. 2 is an enlarged detail sectional view on the line 2—2 in Fig. 1.

Fig. 3 is a sectional view on the line 3—3 in Fig. 2 showing the position of the parts when the crate is folded together.

Fig. 4 is a horizontal sectional view of the crate, looking down upon the bottom section.

Fig. 5 is an enlarged section on the line 5—5 in Fig. 4.

Fig. 6 is an enlarged detail section on the line 6—6 in Fig. 1.

Fig. 7 is an enlarged detail section on the line 7—7 in Fig. 1.

Fig. 8 is an enlarged detail section on the line 8—8 in Fig. 4.

Fig. 9 is a top view of a modified form of the crate, fractional portions being broken away.

Fig. 10 is an enlarged detail sectional view on the line 10—10 in Fig. 9.

Fig. 11 is an enlarged detail sectional elevation on the line 11—11 in either Figs. 9 or 1.

Fig. 12 is a perspective view of fractional portions of a crate, illustrating a modification in the cover securing means and certain hinge connections.

Fig. 13 is a perspective view as seen substantially on the line 13—13 in Fig. 12.

Fig. 14 is a perspective view of an improved type of hinge section, adapted to be used in the crate.

Fig. 15 is a plan view showing a further modification of the cover construction.

Fig. 16 is an enlarged detail sectional view on the line 16—16 in Fig. 15.

Fig. 17 is an enlarged detail sectional view on the line 17—17 in Fig. 15.

Fig. 18 is an enlarged detail section on the line 18—18 in Fig. 15.

Fig. 19 is a fractional view of a further modification in the cover construction.

Fig. 20 is an enlarged detail section on the line 20—20 in Fig. 9.

Fig. 21 is a perspective view of the adjacent lower corners of side and end sections of a crate showing an improved hinge modification.

Referring to the drawings more particularly and by reference characters, A and B designate the side sections of a crate having a bottom E and a top or cover F. Only one type of bottom section is shown, as in Figs. 3, 4, 5 and 8, but it is to be understood that bottom sections similar to the cover sections may be employed in place of the illustrated bottom E, as either type is employed to close the open end of a crate, but, for sake of convenience such closures, except for section E, will hereinafter be called covers or cover sections. The preferred material for use in the crate is wood, and all of the sections above mentioned consist of frames, slats and rails secured together in the novel combinations now to be set forth. In all the structures shown the side and end sections are hinged together in such a manner that when the top and bottom sections are removed then the side and end sections may be folded against each other, and such sections are made up preferably of vertical spaced slats secured together by top, middle and bottom horizontal cross bars. In Figs. 1, 2, 3, 6, 9, 10, 11, 15, 17, 18 and 20 the top edges of the end sections are lower than the top edges of the side sections while in Fig. 12 the opposite arrangement is true, for reasons later to be explained.

Referring momentarily to the form of crate shown in Figs. 1 to 8, inclusive, it will be seen that the side sections A and B of the crate are provided at their inner upper ends with strips or rails 22, under which are secured the ends of transverse slats of the cover F, while the longitudinally arranged slats of the cover rest upon the end sections of the crate.

The type of cover section shown in Figs. 1, 2, 6, 7 and 11, consists of two interslidably arranged and secured frames, one of which consists of longitudinally arranged slats 23, 24 and 25, and transverse slats 26, and the other or locking frame consists of longitudinal slats 27 and 28 and transverse slats 29. The slats 27 and 28 rest on the slats 26 and the slats 29 are slidably secured under the slats 24, thus slidably locking the two frames together. As the slats 26 and 29 at the ends of the section are close together they will guide one frame in its movement with respect to the other frame. The slats 26 extend far enough beyond the slats 23 to engage and lock under the adjacent rail 22 and the slats 29 pass under the slat 25 and project far enough therebeyond to engage under the other rail 22 when the cover is in locked position. At this time also the slats 28 and 25 are close together and the slats 23 and 27 are spaced apart, as shown in Figs. 1 and 6. When the slat 27 is closed against the slat 23 it pulls the slats 29 and 28 with it, thus withdrawing the slat ends under the rail 22 of section B, and the cover section may be readily removed. The cover is further locked into its closed position by means of the devices shown in Figs. 1, 6, 7 and 11, now to be described.

Upon one of the slats 29 I provide a plate 30 having a wedged tooth 31, adapted to be pulled under the slat 24, in such a manner that it will prevent the reversal of such a movement until the slats 24 and 29, which are normally spring held together, are separated sufficiently to release the tooth. Upon the undersides of the slats 23 and 25 I also rotatably secure hooks 32 and 33 for engagement under and back of the rails 22, for the purpose of further locking the cover and to prevent any spreading of the side sections away from the cover. The hooks 32 and 33 are provided with flat finger pieces 34, which are so arranged that they will be free to turn when the cover is in place, but not locked, and will come directly under the bars 27 and 28, when the cover is locked, so that the hooks cannot be rotated and disengaged from the bars 22, except when the cover frames are in removable position. I also provide means, at the ends of the center slat 24 of the cover, to prevent spreading of the cover and end sections from each other, and each consists preferably of a hook 35 (see Fig. 11) on the end section adapted to be engaged by a small bracket 36 of said slat 24, and so arranged that the engagement will take place automatically, after the cover is placed, by moving the sections into locking position.

The bottom section E, as shown in Figs. 3, 4, 5 and 8, is hingedly secured as at 37, to the side section B, so that it will swing inwardly into the crate when the same is collapsed. A rail 38 is secured on the side section, under the hinges, to support the adjacent edge of the bottom section, when it is in open position. Similar blocks or strips 39 on the end sections C and D support a center slat 40 of the bottom section, while the swinging end of the bottom section rests upon a rail 41, at the lower end of the section A. One of the inner transverse slats 42 of the section is provided with a rigid hook 43, which drops behind the rail 41 to prevent spreading of the side section A away from the bottom. The bottom section E is locked in place by a small sliding or locking frame G, which has a pair of slats 44 which engage under straps 45 on the side section A. The frame G is locked in place by a spring hook 46 which snaps over a slat 47 of the frame G.

When the crate is knocked down or collapsed for return shipment to the original sender it is desired to leave a space within it in which can be carried the bottom E and in some cases also the top F, and for this reason I provide at two opposite corners of the crate, which corners will be at the ends of the collapsed crate, what I choose to call spanning hinges, such as shown in Figs. 2, 3, 4, 12 and 13. The hinge structure shown in Figs. 2, 3, and 4 consists of a pair of plates 48, having overlapped flanges 49, pivotally connected as at 50. The flanges 49 are arranged above and below the section E when the latter is raised so as not to interfere therewith, and the rivet 50 is arranged far enough in from the sections D and A, and B and C, to cause them to spread, when folded together, to allow the required space therebetween. The hinge shown in Fig. 13 consists of an angularly shaped bail 51 which is pivotally secured, at its ends, to the adjacent sections by suitable means such as straps 52. It is obvious that such a hinge will not only prevent spreading or bulging of one section away from the other, but will also effect the spanning feature and will not interfere with the contents of the crate or reduce its capacity, as, for instance, when it is to be completely filled with square or rectangular cartons, cans, and the like.

The connection between the sections B and D, shown at the lower end of Fig. 12, consists of a pair of U-shaped straps 53 secured to the respective sections and spaced at their inner ends therefrom, so as to form slots for receiving a common link 54. This construction, while not the preferred form, permits the adjacent sections to be spanned (when the crate is collapsed) as the link will follow to the inner ends of the slots, and will also prevent any undue spreading or bulging of one section away from the other.

Any suitable type of hinge may be employed at the other corners of the crate, as they swing, door fashion, one from the other, but I have perfected preferred types which are shown in Figs. 4 and 14 and in Fig. 21. The construction shown in Fig. 4, embodies two butts of the kind shown in Fig. 14, each of which consists of a U-shaped member 55 having outwardly struck pintle bearings 56 and inwardly struck securing members 57.

The butts are secured upon the section by being clamped upon it, in such a manner that the triangular members 57 will pierce the wood and secure the butt firmly in place.

The hinge shown in Fig. 21 is very simple and effective but is limited to a location at the juncture of vertical and horizontal slats of the sections. It consists of a pair of plates having horizontal portions 58, pivotally connected as at 59, and offset vertical flanges 60 which are respectively nailed or in some other manner suitably secured to the outer faces of the vertical and horizontal slats of the sections.

In the crate structure shown in Figs. 9, 10 and 20, the rails 61 under which are secured the cover slats, are secured upon the outer faces of the side sections, instead of upon the inner sides as in Figs. 1, 2 and 6. The cover section F, in this instance is a unitary structure, not having a sliding or locking frame, and its transverse slats 62 extend only to the outer edges of the horizontal or longitudinal slats 63 and 64, while the intermediate slats 65 project with short ends beyond the slats 64, to engage under the adjacent rail 61, and the other or long ends of the slats 65 are adapted to engage under the opposite rail 61. A locking strip 66 is hingedly secured to the slat 63, as at 67, and is spring held down against the slats 65 by springs 68. The hinge plates are provided with integral hooks 69, which, when the locking strip is down, engage over straps 70 on the adjacent side section, and prevent the latter from bulging away from the cover. Between the strips 64 and one of the slats 62 is mounted a rotatable hook 71 (see Figs. 9 and 20) adapted, when turned up, to engage behind a strap 72 on the section B and prevent it from bulging. The hook 71 is provided with a crank 73 which can be turned a half rotation on the slat 62 when a block 74, spring hinged to the slat 74, is lifted. When this cover is to be put in place, the locking strip 66 is first raised, as indicated by dotted lines in Fig. 10, and the long ends of the slats 65 are threaded under the rail 61, and between the upright slats of the section A, until the opposite edge of the cover drops down into place. The cover is then moved over into the position shown in Fig. 9, until the locking strip can drop into place. This movement also locks the cover to the end section, as previously explained in connection with the device shown in Fig. 11. The block 74 is then lifted up, and the crank 73 is thrown over, thus turning the hook 71 up behind the strap 72.

In the modification shown in Fig. 12 the rail 61 is also utilized upon the outer side of the sections A and B, and the cover F is composed of interlocking slidable frames 75 and 76, having hooks 77 which are adapted to close against and under the rails 61, to lock the cover section down upon the upper edges of the side sections. In this construction it is obviously preferable to construct the end sections higher than the side sections, so they will properly close against the ends of the cover sections and thus render the crate more rigid.

In the cover design shown in Figs. 15, 16, 17 and 18, two interslidably arranged and interlocked frames 78 and 79 are arranged to lock upon a crate of the type also shown in Fig. 9, but said frames do not have projecting side slats, and the outer slats 80 and 81 are attached to and form part of the respective frames 78 and 79. The sides of this cover are provided with rigid hooks 80ª and fingers 81 and 82, and end hooks 83 and 84. The fingers 82 are long enough to engage under the rail 61, and are preferably first set into place when the cover is to be secured. The frames are then pulled apart the required distance to engage the fingers 81 under the straps 85. The hook 83 of course drops down upon its strap 86 when the cover is let down into place but the hooks 80ª and 84 are engaged under and back of their respective straps 87 by first springing the end (or side) section out and then pressing the cover down until the hooks can be slipped into place. This insures a rigid connection between the sections, and prevents bulging of one away from the other. In this cover one of the frames is provided with a simple spring latch 88 which snaps against the other frame and holds it locked until the latch is manually released.

The cover, of which a portion is shown in Fig. 19, has features which are common to the covers already described above, and is especially adapted to be used in the crate illustrated in Figs. 9 and 12. It comprises a pair of interlocking frames, one of which consists of transverse slats 89 and crossing slats 90, and the other consists of correspondingly arranged slats 91 and 92. The frame 89—90 has no projecting slats for locking purposes while the transverse slats of the frame 91—92 have short and long projecting ends adapted to engage in the crate in practically the same manner as is the cover shown in Fig. 9; i. e., by shifting the locking frame in both directions, successively. This frame can of course be locked into its engaging position with the vertical sections of the crate by any suitable means such as have been previously herein set forth.

It is understood that various suitable modifications may be made in the general design and structural details of the invention, as herein illustrated and described, provided, however, that such modifications come within the spirit and scope of the appended claims.

Having now therefore fully shown and described my invention, what I claim to be new and desire to protect by Letters Patent is:

1. The combination with a crate, of an extensible cover therefor, locking devices slidably and rotatably secured upon the cover for locking engagement with the crate, and means operated by extending the cover for preventing rotation of said devices when the cover is in secured position.

2. The combination with a crate having an extensible cover, of a cover locking member rotatably secured upon the cover for engagement, at one end, with the adjacent wall of the crate, and means operated by extending the cover for releasably retaining the locking member against rotation when in a locked position.

3. The combination with a crate, of a cover for closing the crate and comprising a pair of interslidably secured sections, cover locking devices turnably secured on said sections and having outer extensions for locking engagement with opposite walls of the crate, and means operated by slidably operating the sections for releasably securing the locking devices.

4. The combination with a crate, of a cover for closing the crate and comprising a pair of interslidably secured sections, cover locking devices turnably secured on said sections and having outer extensions for locking engagement with opposite walls of the crate, and means whereby each of said cover sections may operate to releasably engage the locking devices of the other section to prevent rotation and displacement of the locking devices with respect to the crate walls.

In testimony whereof I affix my signature.

CORNELL FLAGSTAD.